US011022731B2

(12) United States Patent
Waller et al.

(10) Patent No.: US 11,022,731 B2
(45) Date of Patent: Jun. 1, 2021

(54) OPTICAL PHASE RETRIEVAL SYSTEMS USING COLOR-MULTIPLEXED ILLUMINATION

(71) Applicant: THE REGENTS OF THE UNIVERSITY OF CALIFORNIA, Oakland, CA (US)

(72) Inventors: Laura Waller, Berkeley, CA (US); Zachary Phillips, Berkeley, CA (US); Michael Chen, Irvine, CA (US)

(73) Assignee: THE REGENTS OF THE UNIVERSITY OF CALIFORNIA (*) Notice: Subject to any disclaimer, the term of this patent is extended or adjusted under 35 U.S.C. 154(b) by 169 days.

(21) Appl. No.: 16/155,077

(22) Filed: Oct. 9, 2018

(65) Prior Publication Data

US 2019/0107655 A1 Apr. 11, 2019

Related U.S. Application Data

(63) Continuation of application No. PCT/US2017/027679, filed on Apr. 14, 2017.
(Continued)

(51) Int. Cl.
G02B 5/20 (2006.01)
G02B 21/14 (2006.01)
(Continued)

(52) U.S. Cl.
CPC ............ *G02B 5/201* (2013.01); *G02B 21/14* (2013.01); *G02B 21/365* (2013.01);
(Continued)

(58) Field of Classification Search
CPC ...... G02B 5/201; G02B 21/14; G02B 21/365; H04N 9/00; H04N 5/23229;
(Continued)

(56) References Cited

U.S. PATENT DOCUMENTS 4,200,353 A 4/1980 Hoffman
8,039,776 B2 10/2011 Cui
(Continued)

FOREIGN PATENT DOCUMENTS

EP 0274155 A1 7/1988

OTHER PUBLICATIONS

ISA/KR, Korean Intellectual Property Office (KIPO), International Search Report and Written Opinion dated Aug. 30, 2017, related PCT international application No. PCT/US2017/027679, pp. 1-13, claims searched, pp. 14-17.
(Continued)

*Primary Examiner* — Que Tan Le
*Assistant Examiner* — Jennifer D Bennet
(74) *Attorney, Agent, or Firm* — O'Banion & Ritchey LLP; John P. O'Banion

(57) ABSTRACT

Systems and methods are disclosed for recovering both phase and amplitude of an arbitrary sample in an optical microscope from a single image, using patterned partially coherent illumination. This is realized through the use of a encoded light source which embeds several different illumination patterns into color channels. The sample is modulated by each illumination wavelength separately and independently of each other, but all of the channels are sensed by the imaging device in a single step. This color image contains information about the phase and amplitude of a sample encoded in each channel, and can be used to recover both amplitude and phase from this single image, at the incoherent resolution limit. Further, extensions of this method are shown which allow the same recovery of a sample whilst it is moving during a single exposure using a motion deblurring algorithm.

26 Claims, 14 Drawing Sheets

Related U.S. Application Data

(60) Provisional application No. 62/323,461, filed on Apr. 15, 2016.

(51) Int. Cl.
 G02B 21/36 (2006.01)
 H04N 5/232 (2006.01)
 H04N 9/07 (2006.01)

(52) U.S. Cl.
 CPC ..... H04N 5/23229 (2013.01); H04N 5/23264 (2013.01); H04N 9/07 (2013.01); *H04N 2209/043* (2013.01); *H04N 2209/044* (2013.01)

(58) Field of Classification Search
 CPC .......... H04N 5/23264; H04N 9/07; H04N 2209/043; H04N 2209/044
 See application file for complete search history.

(56) References Cited

U.S. PATENT DOCUMENTS

| | | | |
|---|---|---|---|
| 2011/0044524 A1* | 2/2011 | Wang | G01R 33/54 382/131 |
| 2014/0118529 A1* | 5/2014 | Zheng | G02B 21/367 348/80 |
| 2016/0266366 A1* | 9/2016 | Chung | G02B 21/0072 |
| 2018/0284418 A1* | 10/2018 | Cohen | G02B 21/365 |

OTHER PUBLICATIONS

Lee, Donghak et al., "Color-coded LED microscopy for multi-contrast and quantitative phase-gradient imaging", Biomedical Optics Express, vol. 6, No. 12, pp. 4912-4922, Nov. 18, 2015.

Ma, Chenguang et al., "Motion deblurring with temporarily coded illumination in an LED array microscope", Optics Letters, vol. 40, No. 10, pp. 2281-2284, May 15, 2015.

\* cited by examiner

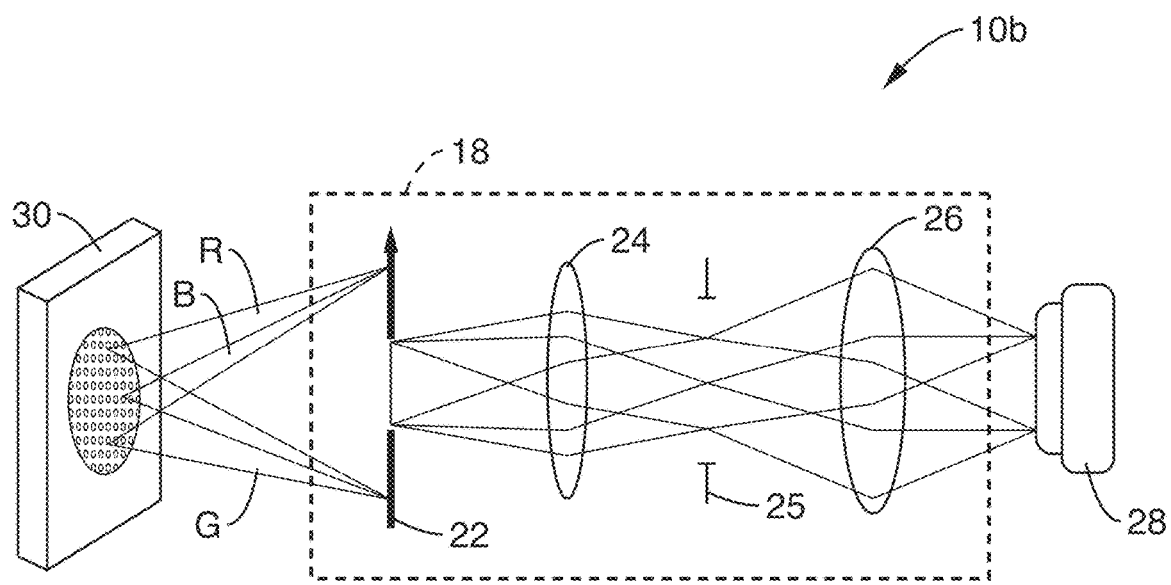
FIG. 5
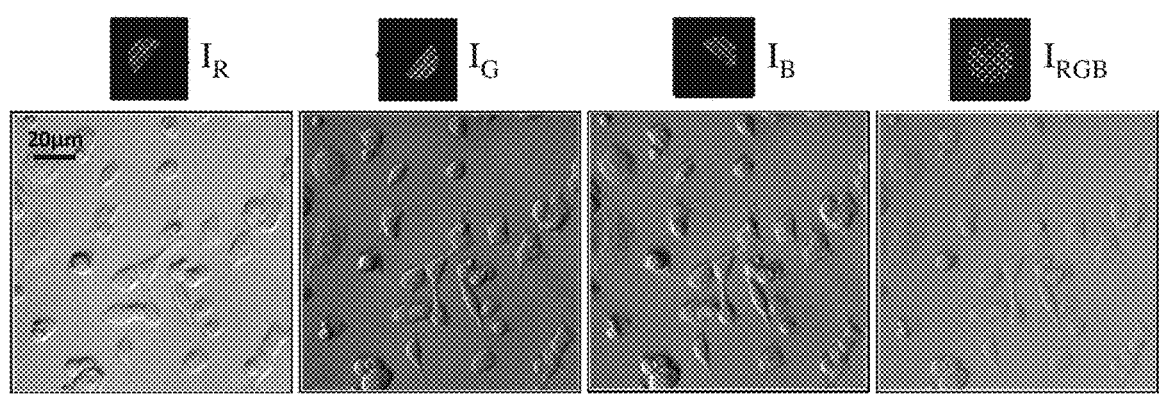
FIG. 6A     FIG. 6B     FIG. 6C     FIG. 6D

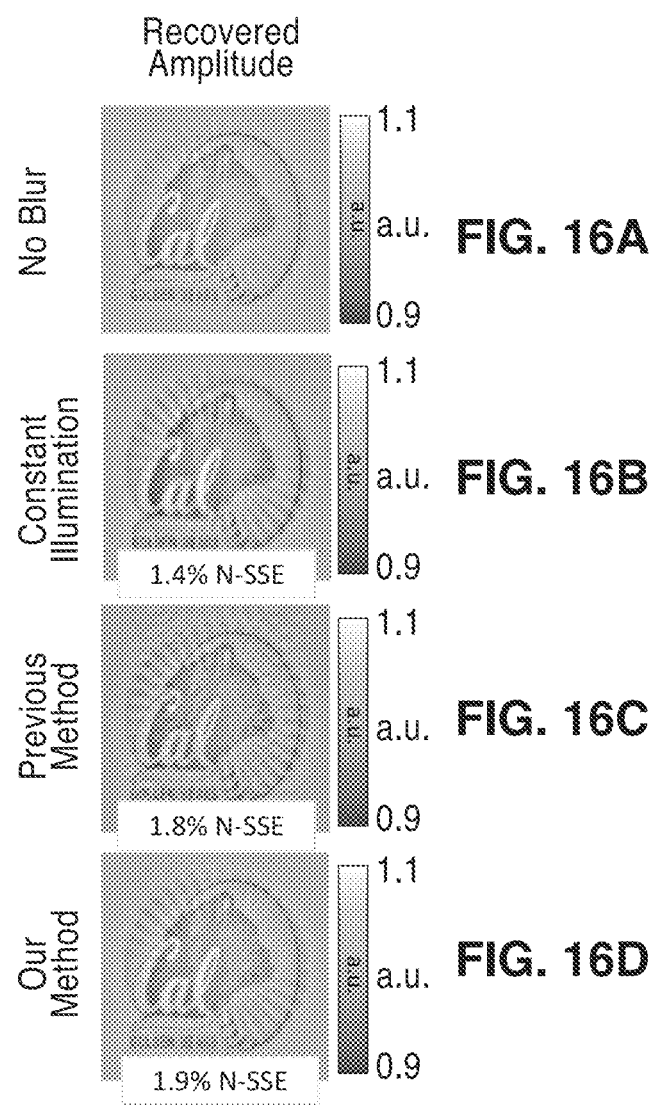

OPTICAL PHASE RETRIEVAL SYSTEMS USING COLOR-MULTIPLEXED ILLUMINATION

CROSS-REFERENCE TO RELATED APPLICATIONS

This application claims priority to, and is a 35 U.S.C. § 111(a) continuation of, PCT international application number PCT/US2017/027679 filed on Apr. 14, 2017, incorporated herein by reference in its entirety, which claims priority to, and the benefit of, U.S. provisional patent application Ser. No. 62/323,461 filed on Apr. 15, 2016, incorporated herein by reference in its entirety. Priority is claimed to each of the foregoing applications.

The above-referenced PCT international application was published as PCT International Publication No. WO 2017/181044 A1 on Oct. 19, 2017, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This description pertains generally to imaging, and more particularly to single-shot quantitative phase imaging.

2. Background Discussion

Quantitative Phase Imaging (QPI) involves recovering the complete optical field of an object, when illuminated by a light source such as a lamp or laser. The complex optical field at a given point can be described by the amplitude and phase of this signal; however, the phase information of the incident wavefront is lost during the integration cycle of a digital imaging sensor. Several solutions have been proposed to recover this lost information indirectly, using a variety of hardware as well as software methods. Among the most common is the phase contrast microscope, which is widely used in biological research and in medicine. A standard phase-contrast microscope provides contrast by encoding phase information into amplitude, which can be directly observed. This method is inherently not quantitative, as it relies on interference of an object with part of its own frequency spectrum and does not completely decouple phase and amplitude, although inversion methods have been proposed. Other phase imaging methods include Differential Interference Contrast (DIC), which is also not quantitative, but can be synthesized through quantitative phase measurements.

Other methods use purely geometric optics, such as lenses to encode both intensity (amplitude) and direction (phase) of incoming photons by mapping these variables to pixels directly. While this approach requires specialized imaging hardware and can only accept a limited range of angles, it does not require a specific illumination source or multiple images to form their reconstruction, making them well-suited for photographic applications and devices. However, the limited phase bandwidth of these systems is problematic for quantitative phase imaging.

Interferometric methods use coherent illumination and precise alignment to image the absolute phase of two incident plane waves. These methods can be very problematic due their expensive and complicated hardware setups, as well as their sensitivity to misalignment and vibrations, making them poorly suited for practical usage for clinical studies.

A similar, viable single-shot alternative, Color TIE, combines techniques of chromatic dispersion with a phase retrieval method using the Transport of Intensity equation, but requires coherent illumination, restricting it's resolution to half of phase imaging methods using partially coherent illumination.

Recent developments involve Differential Phase Contrast Imaging using asymmetric illumination to collect phase information. In practice, this method requires 4 exposures (each with a different illumination pattern) to reconstruct the spectrum of the object. While DPC strikes a favorable balance between resolution, hardware cost, and imaging rate, it is not a single-shot method, and requires a programmable illumination source such as an LED array to achieve real-time frame-rates.

BRIEF SUMMARY

The present description is directed to a single-shot quantitative phase imaging technique for microscopy that can recover quantitative phase from a single color image using very minimal hardware modification. The method is also compatible with most existing microscope hardware that use a color camera, and recovers both amplitude and phase in a single deconvolution. Thus, the systems and methods of the present disclosure are more computationally efficient and simple to use than existing techniques. In addition, since phase can be recovered from a single image, a static light source can be used instead of a programmable LED array or physically shifting illumination filter, which simplifies the design greatly. This also leads to significant gains in speed compared to previous methods, enabling camera-limited frame-rates.

The systems and methods of the present technology can be used anywhere where phase imaging is used. Phase imaging removes the need for chemical staining in many cases, so it has been widely adapted by the greater biomedical community. The systems and methods of the present disclosure are advantageous because they can be used to measure geometric quantities about individual cells, segment cells accurately, and synthesize other kinds of phase images such as those generated by DIC and phase contrast, with minimal hardware, and is compatible with most commercially available microscope setups.

In one embodiment, a method is disclosed for recovering both phase and amplitude of an arbitrary sample in an optical microscope from a single image, using patterned partially coherent illumination. This is realized through the use of a encoded light source which embeds several different illumination patterns into color channels. The sample is modulated by each illumination wavelength separately and independently of each other, but all of the channels are sensed by the imaging device in a single step. This color image contains information about the phase and amplitude of a sample encoded in each channel, and can be used to recover both amplitude and phase from this single image, at the incoherent resolution limit.

The hardware requirements of the present method are compatible with most modern microscopes via a simple condenser insert, or by replacing the entire illumination pathway with a programmable LED array, providing flexibility, portability, and affordability, while eliminating many of the trade-offs required by other methods.

The systems and methods of the present description are configured to encode the angle of incident illumination into different color channels with a camera capable of distinguishing between wavelengths (different color channels), capture images of the sample object and separate the image with these diverse illumination angles, recover quantitative phase and amplitude of the sample from the single image using an inexpensive hardware and software combination and using static or dynamic illumination patterning.

Further aspects of the technology will be brought out in the following portions of the specification, wherein the detailed description is for the purpose of fully disclosing preferred embodiments of the technology without placing limitations thereon.

BRIEF DESCRIPTION OF THE SEVERAL
VIEWS OF THE DRAWING(S)

The technology described herein will be more fully understood by reference to the following drawings which are for illustrative purposes only:

FIG. 5 is a detailed view of the cDPC system of FIG. 2.

FIG. 6A shows an image generated from only from only the red LED pattern of the LED source of the system of FIG. 5.

FIG. 6B shows an image generated from only from only the green LED pattern of the LED source of the system of FIG. 5.

FIG. 6C shows an image generated from only from only the blue LED pattern of the LED source of the system of FIG. 5.

FIG. 6D shows an image generated from all LED patterns of the LED source of the system of FIG. 5.

Figure 8A:
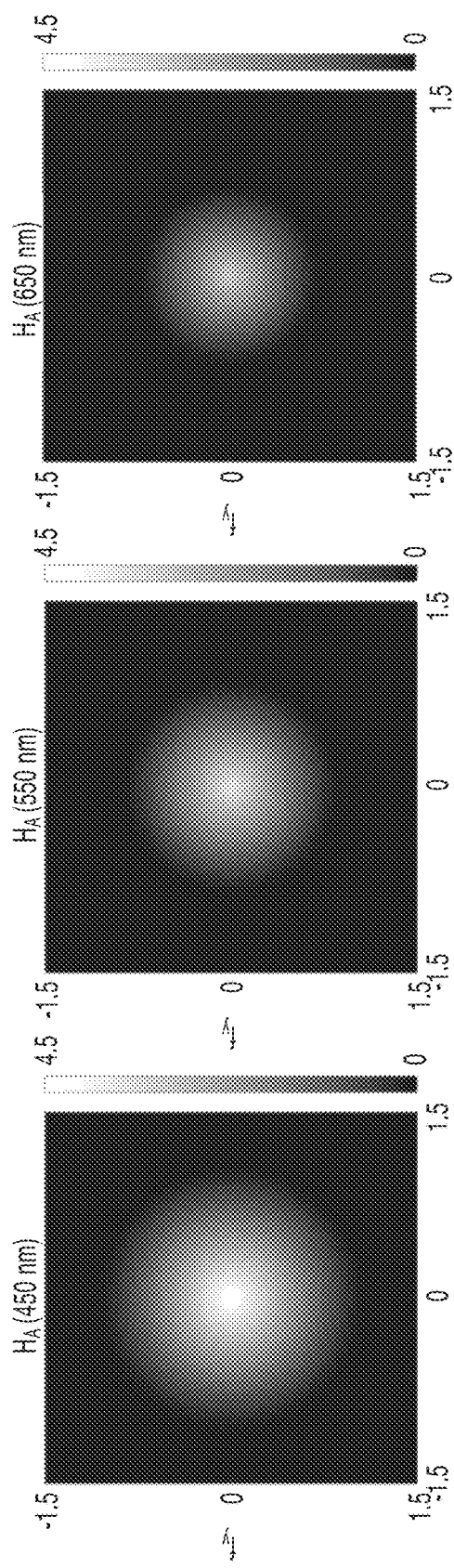
Figure 8B:
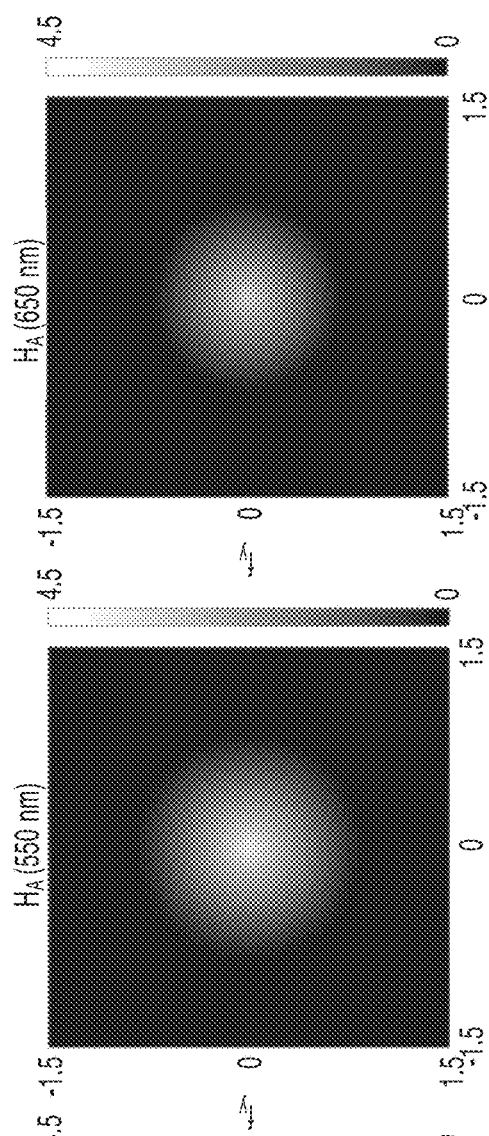
Figure 8C:
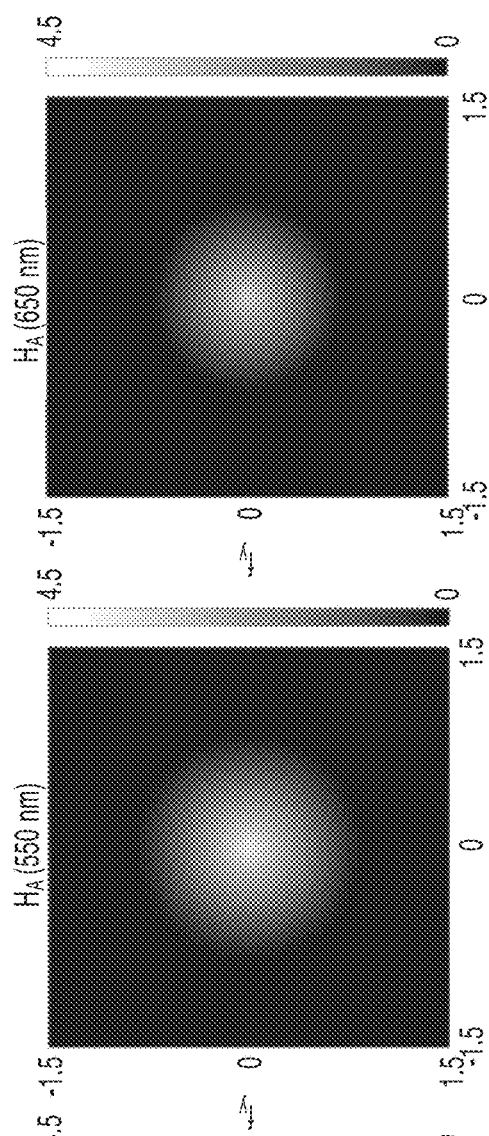
Figure 8D:
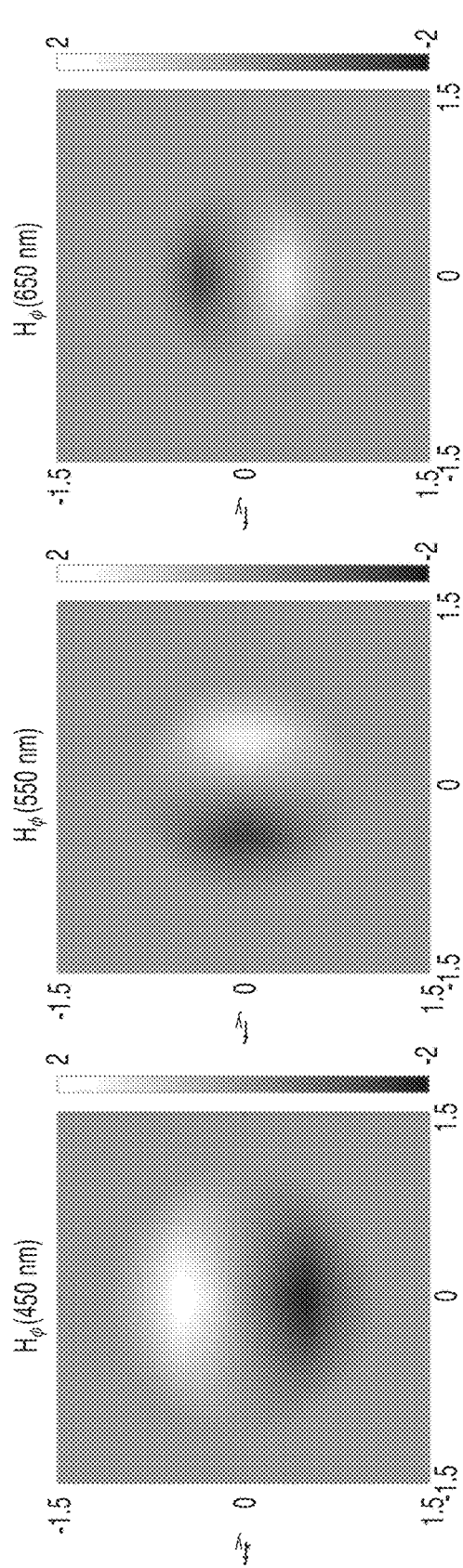
Figure 8E:
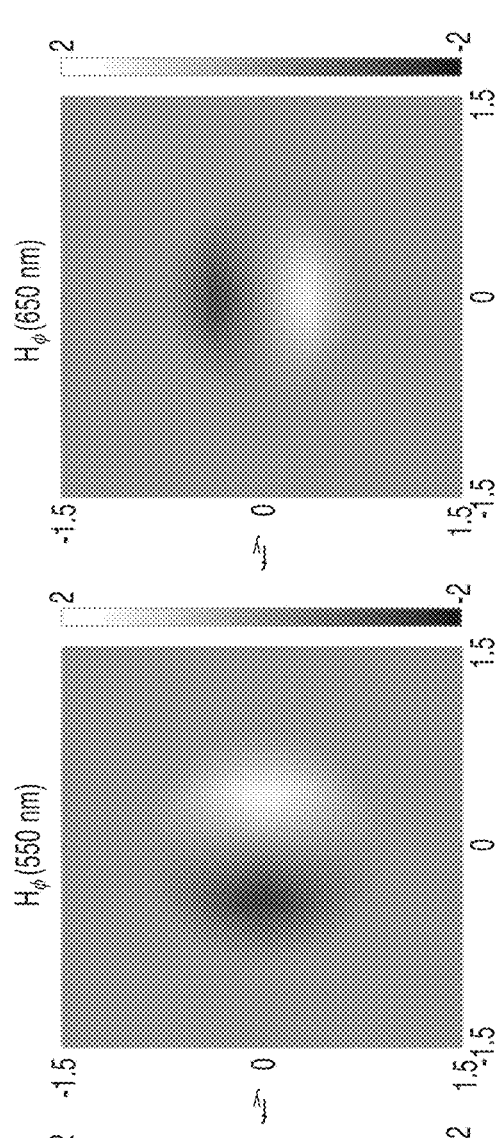
Figure 8F:
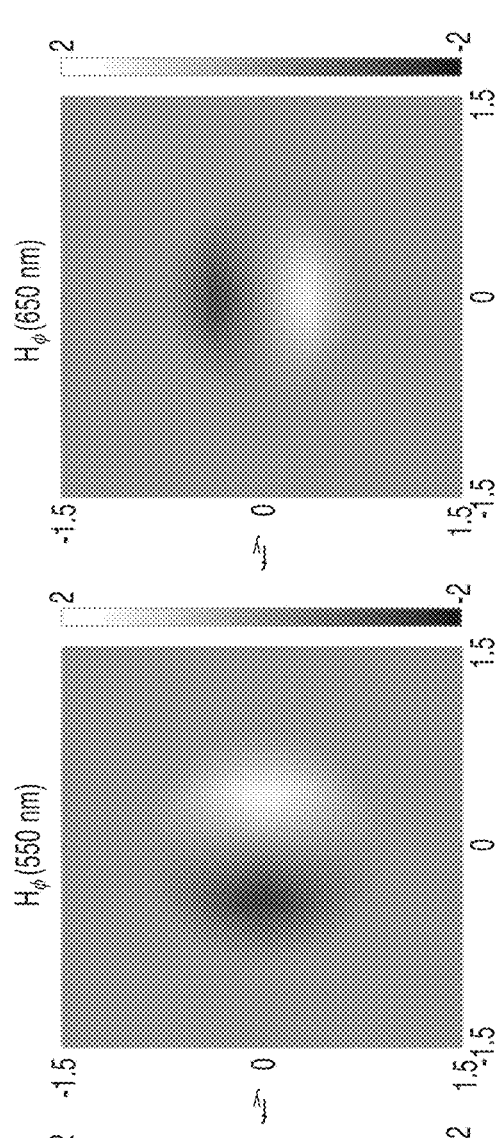

FIG. 8A through FIG. 8F show optical transfer functions for color-multiplexed DPC. FIG. 8A through FIG. 8C show the transfer functions of amplitude for blue, green, and red color channels, respectively. FIG. 8D through FIG. 8F show phase transfer functions for the same wavelengths.

Figure 9A:
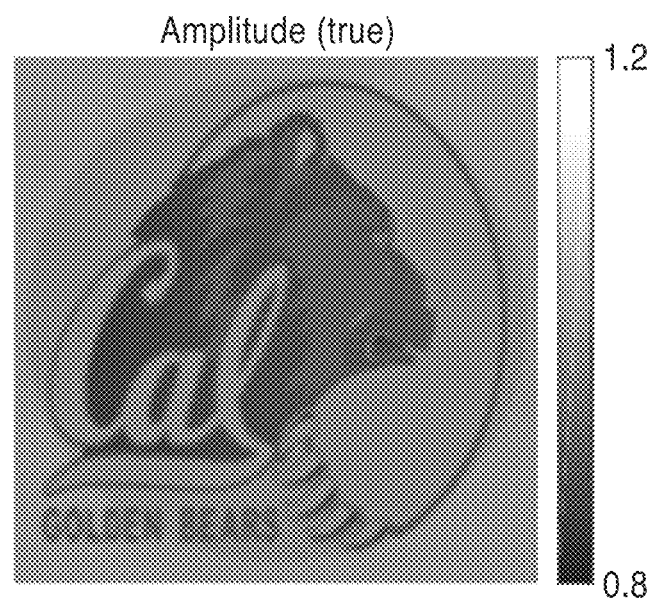
Figure 9B:
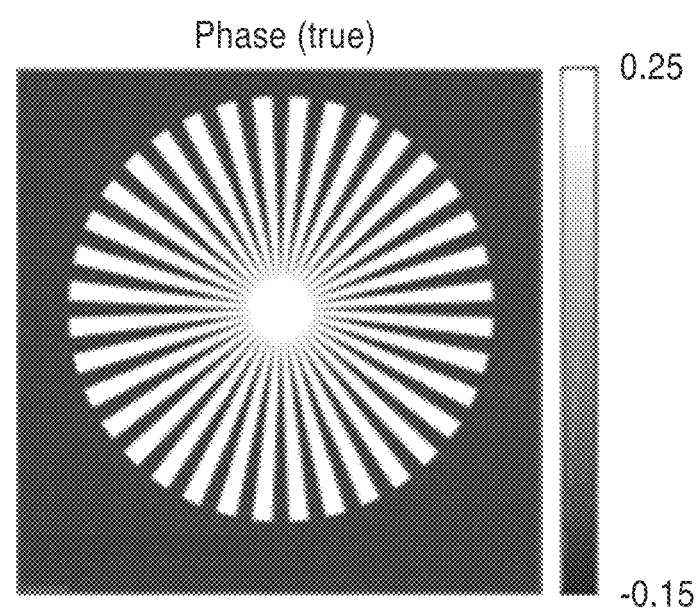
Figure 9C:
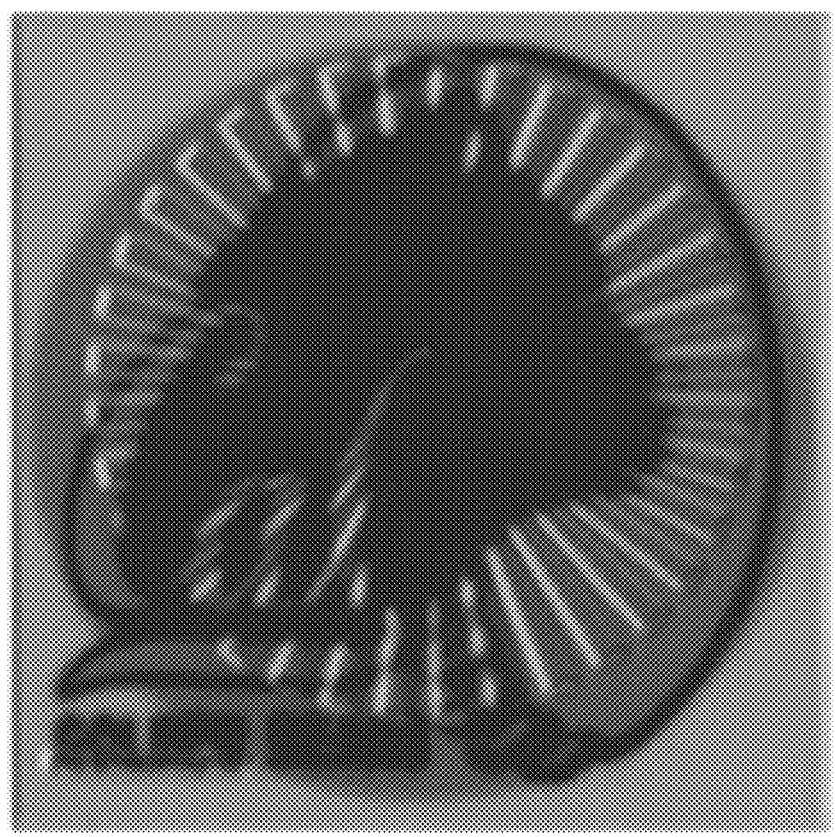
Figure 10A:
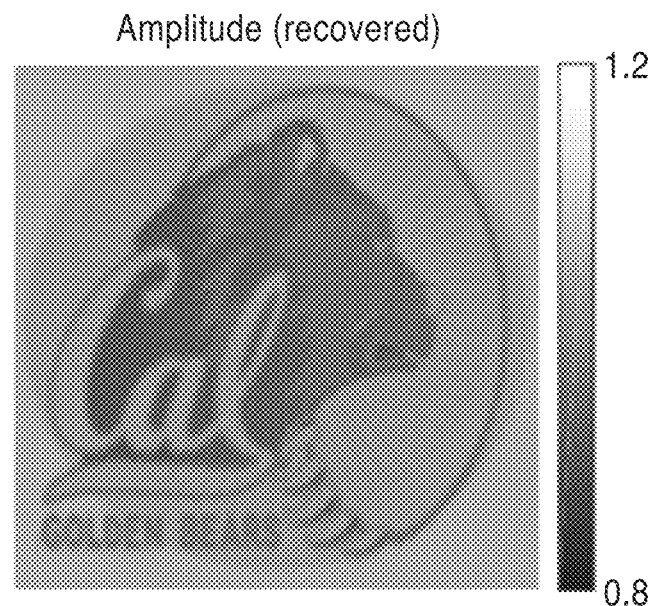
Figure 10B:
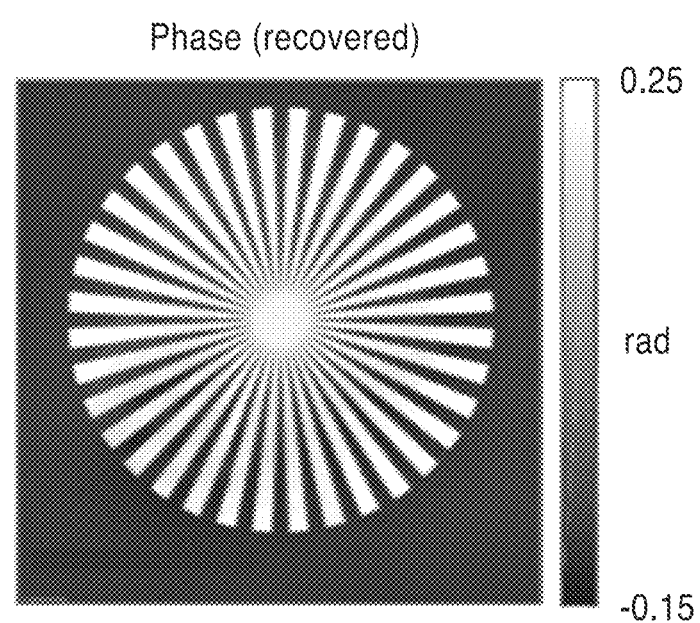

FIG. 9A though FIG. 10B show images of simulation results using cDPC techniques of the present description. FIG. 9A, FIG. 9B and FIG. 9C show the ground truth for amplitude (A) and phase (0) and simulated intensity, respectively. FIG. 10A and FIG. 10B show the amplitude and phase recovered by the method of the present description.

Figure 11A:
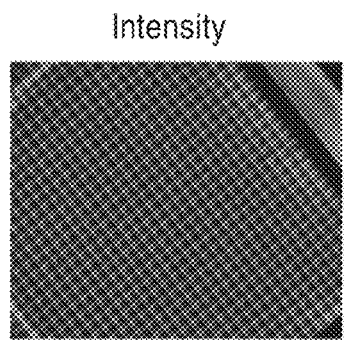
Figure 11B:
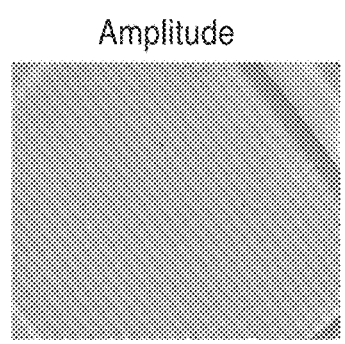
Figure 11C:
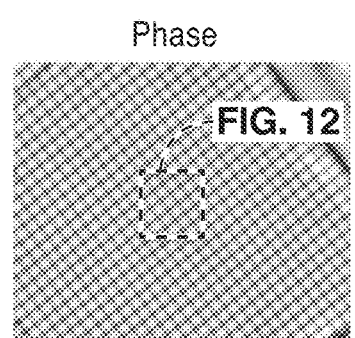

FIG. 11A through FIG. 11C show images of intensity (after background subtraction), reconstructed amplitude, and recovered phase, respectively.

Figure 12:
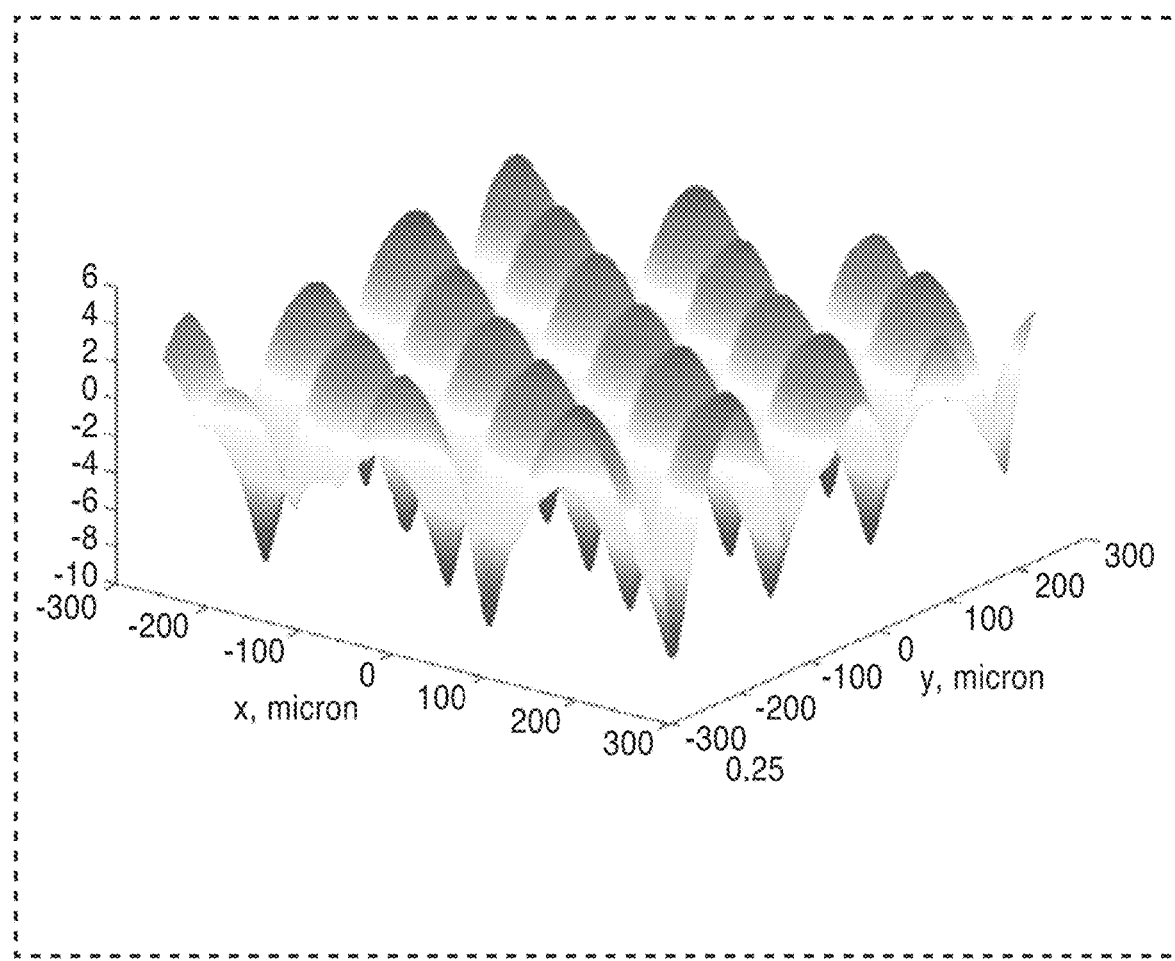

FIG. 12 shows a plot of a 3D rendering of the surface of the micro-lens array within the region detailed by the white square in the phase reconstruction image of FIG. 11C.

Figure 13:
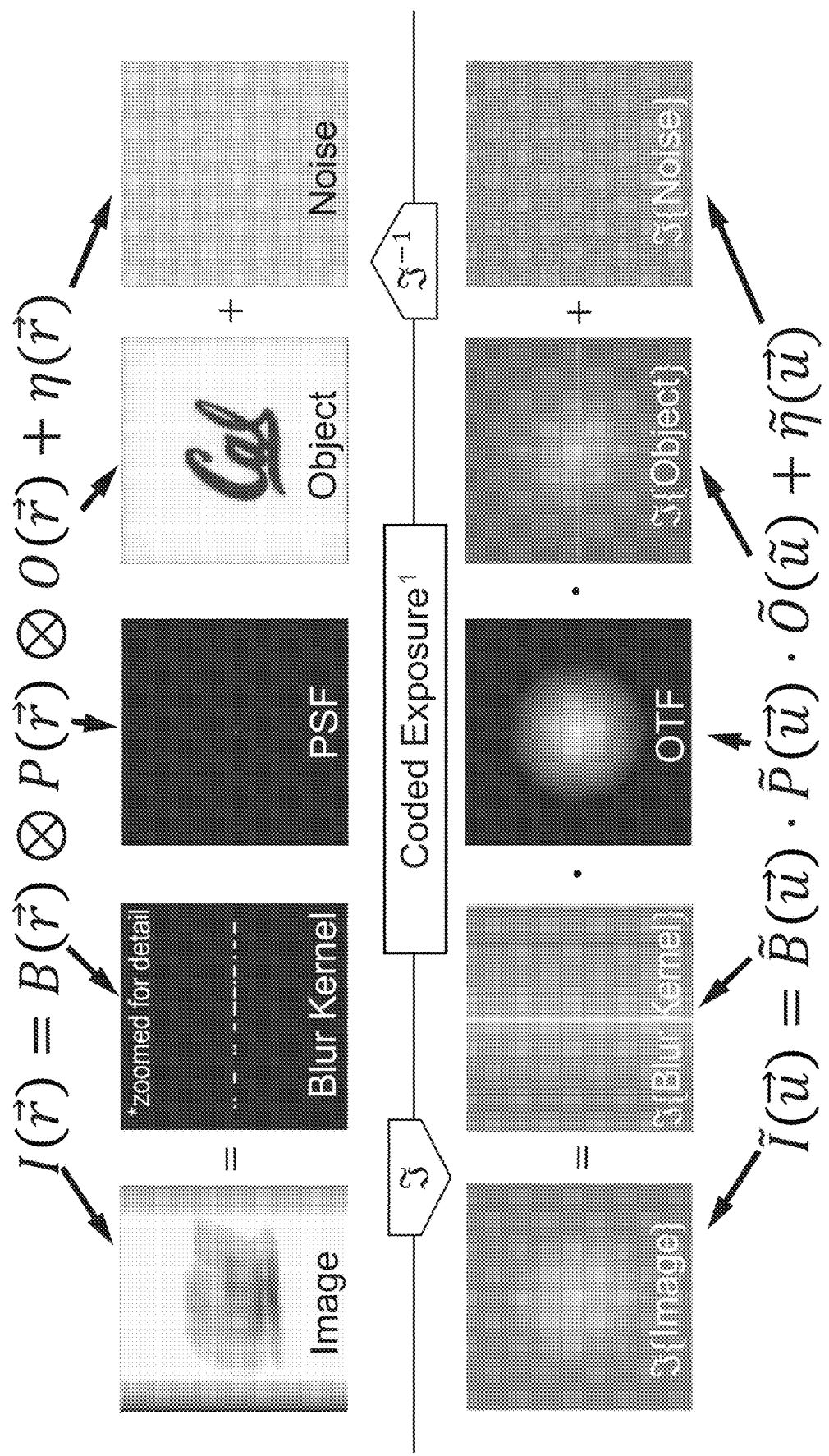

FIG. 13 shows an image of the motion blurring forward model in accordance with the present description.

Figure 14:
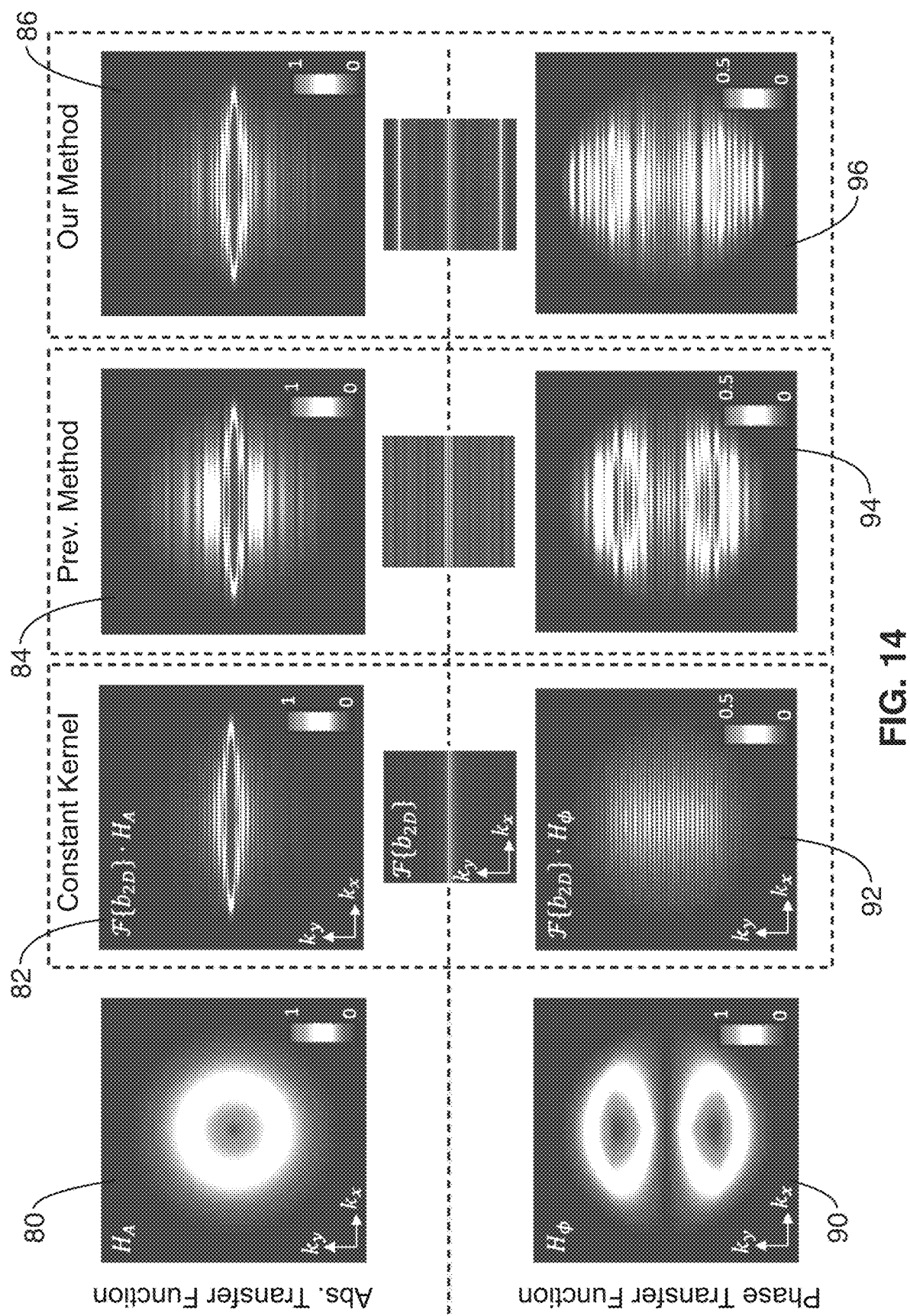

FIG. 14 shows motion blurring kernels for 1D motion in the Fourier Domain.

Figures 15A, 15B, 15C, 15D:
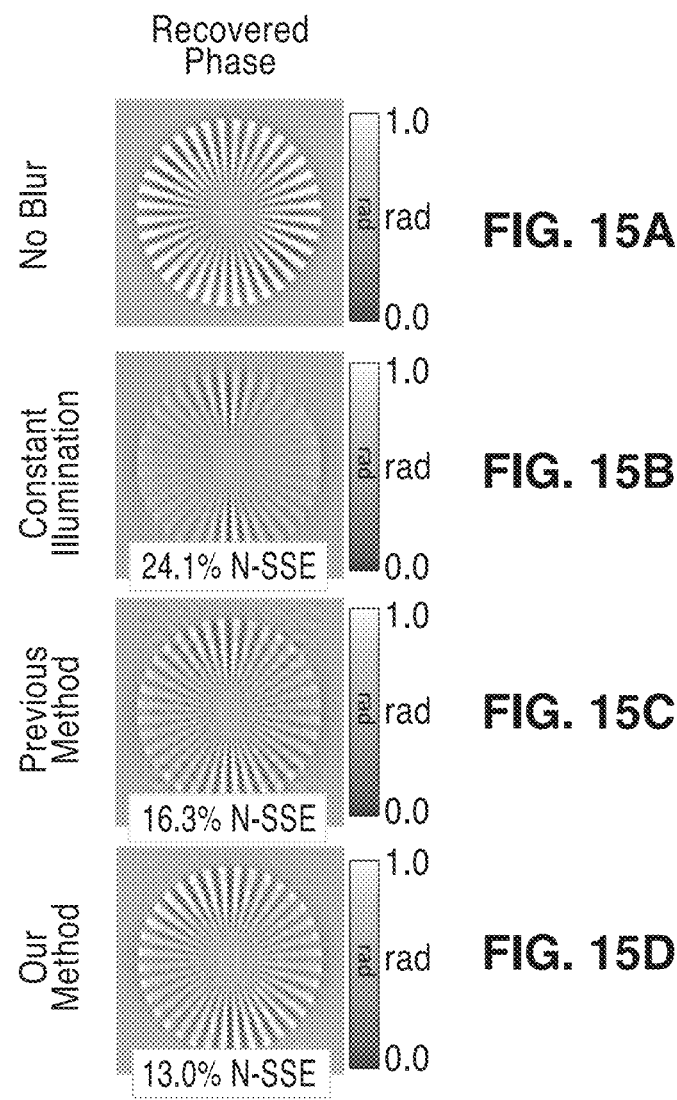

FIG. 15A through FIG. 16D show simulation results for motion deblurring+quantitative phase imaging. FIG. 15A and FIG. 16A show recovered phase and recovered amplitude, respectively, for a static sample. FIG. 15B and FIG. 16B show recovered phase and recovered amplitude, respectively, for deblurring without coded illumination. FIG. 15C and FIG. 16C show recovered phase and recovered amplitude, respectively, for deblurring with the previous method (no spectral reference). FIG. 15D and FIG. 16D show recovered phase and recovered amplitude, respectively, for deblurring using the method of the present description, which accounts for the optical system transfer function.

DETAILED DESCRIPTION

1. Hardware Description

The general hardware components for practicing the methods of the present description are: 1) a color-encoded illumination source (either from a programmable source or static filter); 2) an existing imaging system (i.e. microscope); and 3) a color imaging sensor. Two primary options for color-multiplexed Differential Phase Contrast systems are detailed in FIG. 1 and FIG. 2. It is appreciated that other filter and light source configurations may be contemplated.

Figure 1:
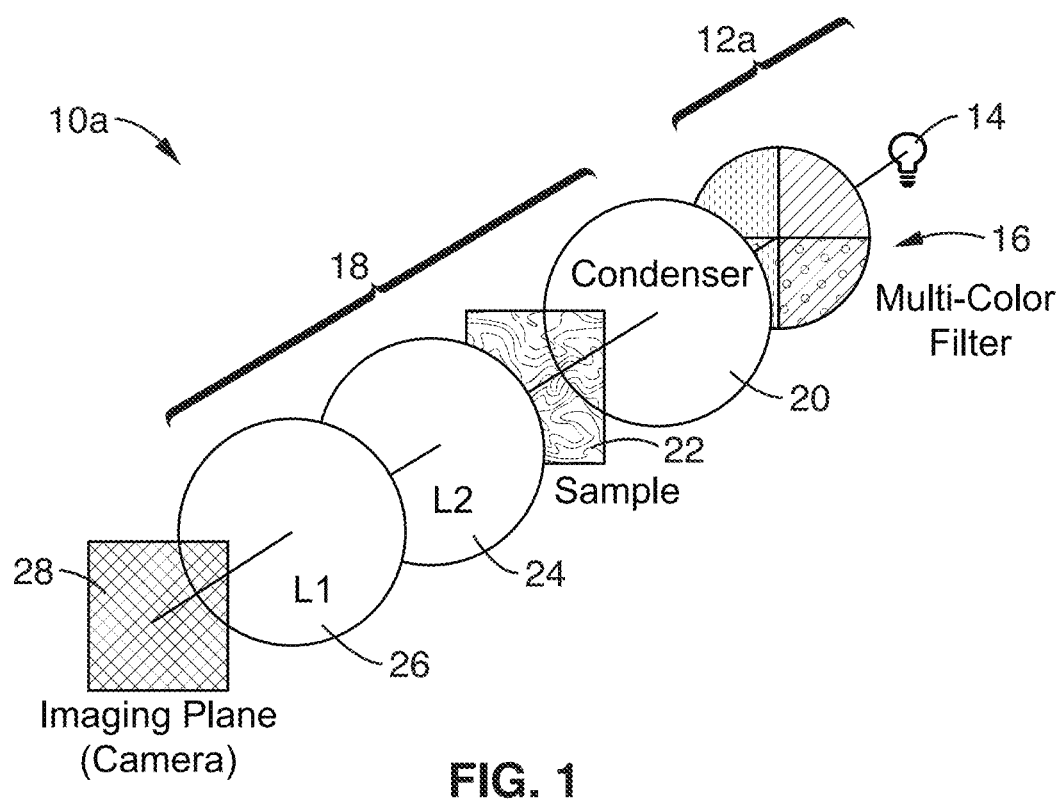
FIG. 1 is an optical schematic view of a color-multiplexed Differential Phase Contrast (cDPC) system using a static filter and broadband light source applied to an infinity-corrected microscope system.

FIG. 1 shows an optical schematic view of a color-multiplexed Differential Phase Contrast (cDPC) system 10a using a multi-color static filter 16 and broadband light source 14 to act as a multi-color light source 12a applied to an infinity-corrected microscope system 18 comprising a first lens 26, second lens 24, with sample 24 disposed between the lenses and a condenser lens 20. The multi-color static filter 16 may be positioned the back focal plane of the condenser lens 20 of microscope 18 as a filter insert (e.g. see filter insert 40 shown in FIG. 4). Spectral encoding is performed in the Fourier domain of the infinity-corrected microscope 18. Light from the broadband light source 14 is directed through the multi-color static filter 16, which encodes the angular diversity of illumination into different spectral bands, which then interact with the sample 22 independently to produce phase contrast. Using lenses 24 and 26, the modulated optical field is then imaged onto the imaging plane of the camera sensor 28 (e.g. RGB color camera) or other color imaging device using a finite-conjugate or infinity-corrected optical system. The multi-color static filter 16 is further detailed below with respect to variations shown in FIG. 3 and FIG. 4.

Figure 2:
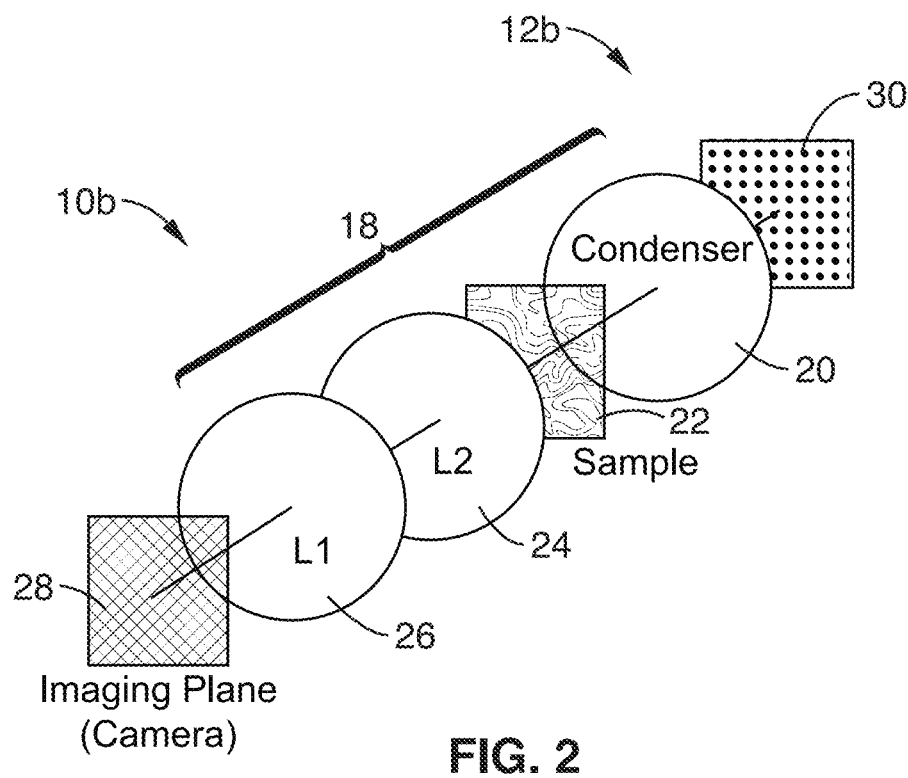
FIG. 2 is an optical schematic view of a cDPC system using a multi-color LED array light source applied to an infinity-corrected microscope system.

FIG. 2 shows an optical schematic view of a cDPC system 10b using a light source 12b comprising a multi-color LED array 30 applied to an infinity-corrected microscope system 18 (shown identical to the microscope 18 of FIG. 1). Instead of modification or addition of a microscope filter insert for condenser lens 20, the multi-color LED array 30 is configured to illuminate different light patterns and encode the illumination into different spectral bands similar or identical to the multi-color filter 16. Light from the multi-color LED array 30 encodes the angular diversity of illumination into different spectral bands that enter microscope 18 to interact with the sample 22 independently to produce phase contrast. The modulated optical field is then imaged onto the imaging plane of the camera sensor 288 (e.g. RGB color camera) or other color imaging device using a finite-conjugate or infinity-corrected optical system.

Figure 3:
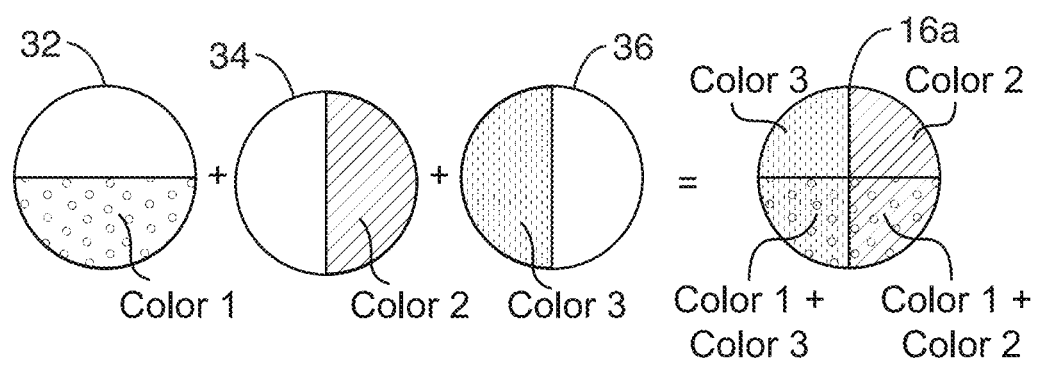
FIG. 3 is a schematic diagram of an Illumination filter pattern that is configured to be is placed at the back focal plane of the microscope condenser lens as provide in FIG. 1. The Illumination filter pattern uses additive color filters to produce three asymmetric illumination patterns, encoding illumination angle to different color channels.

FIG. 3 is a schematic diagram of an Illumination filter pattern of the multi-color filter 16a that is configured to be is placed at the back focal plane of the microscope condenser lens 20 as provide in FIG. 1. The Illumination filter pattern uses three additive color band-pass filters 32, 34, and 36 and each having asymmetric illumination patterns and individual colors (e.g. red, blue, green) for encoding illumination angle to different color channels.

Figure 4:
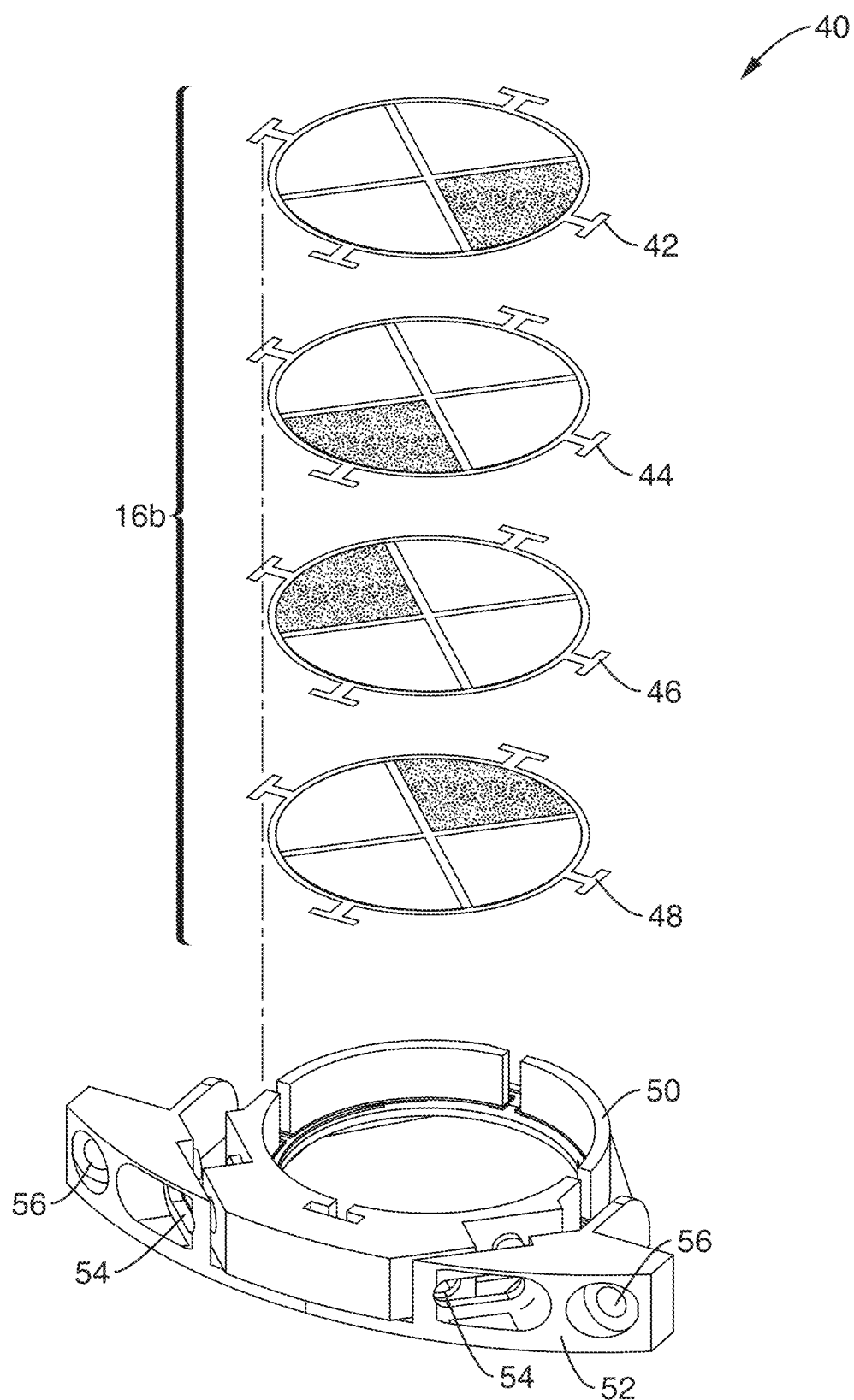
FIG. 4 is a perspective view of a filter insert for use with an existing microscope (e.g. Nikon TE300 microscope).

FIG. 4 is a perspective view of a filter insert 40 for use with an existing microscope 18 (e.g. Nikon TE300 microscope). The insert 40 comprises an array of 4 additive color band-pass filters 42, 44, 46 and 48 that are stacked to form multi-color filter 16b that forms the same pattern as multi-color array 16a in FIG. 3 (e.g. filter 42 comprises color1, filter 44 comprises color2, filter 46 comprises color1+2, and filter 48 comprises color 1+3). The band-pass filters 42, 44, and 46 are stacked adjacent each other in a housing 50 that is insert plate 52. The insert plate 52 comprises a pair of inner holes 54 to allow for insertion of a set screw to adjust the position of the housing 50 and outer holes for mounting to telescope 56. It is appreciated that the filter insert illustrated in FIG. 4 is configured for cooperation with a specific microscope 18 (e.g. Nikon TE300 microscope). It is appreciated that shape and other physical features of the filter insert 40 may vary depending on the microscope used.

The illumination patterns detailed in the spectral filters 16a and 16b shown in FIG. 3 and FIG. 4, as well as the multi-color LED array 30, may be configured to provide contrast in either phase or amplitude, based on the application.

FIG. 5 is a detailed view of the cDPC system 10b of FIG. 2. The multi-color LED array 30 comprises a plurality of small individual LED's, with a plurality of subset of a specified wavelength/color (e.g. red, green, blue) in specified light patterns configured to encode the illumination into different spectral bands similar enter microscope 18 to interact with the sample 22 independently to produce phase contrast. The modulated optical field passes through telescope 18 optics (lenses 24/26 and pupil space 25), and is then imaged onto the imaging plane of the camera sensor 28 (e.g. RGB color camera) or other color imaging device using a finite-conjugate or infinity-corrected optical system.

FIG. 6A shows an image generated from only from only the red LED pattern of the LED array 30 of the system 10b of FIG. 5. FIG. 6B shows an image generated from only from only the green LED pattern of the LED array 30 of the system 10b of FIG. 5. FIG. 6C shows an image generated from only from only the blue LED pattern of the LED array 30 of the system 10b of FIG. 5. FIG. 6D shows an image generated from all LED patterns of the LED array 30 of the system 10b of FIG. 5.

The color imaging sensor 28 is ideally sensitive to both spatial location as well as temporal content (frequency) of the image. The temporal sensitivity need only be fine enough to distinguish between the spectral bands that the illumination is colored into. For example, if the illumination is encoded into Red, Green, and Blue color channels, the camera must be able to distinguish between signals with these three spectra. In this method, it is assumed that frequencies are not modified by the sample (such as by nonlinear materials), and that chromatic dispersion effects of the sample and optical system are minimal.

Figure 7:
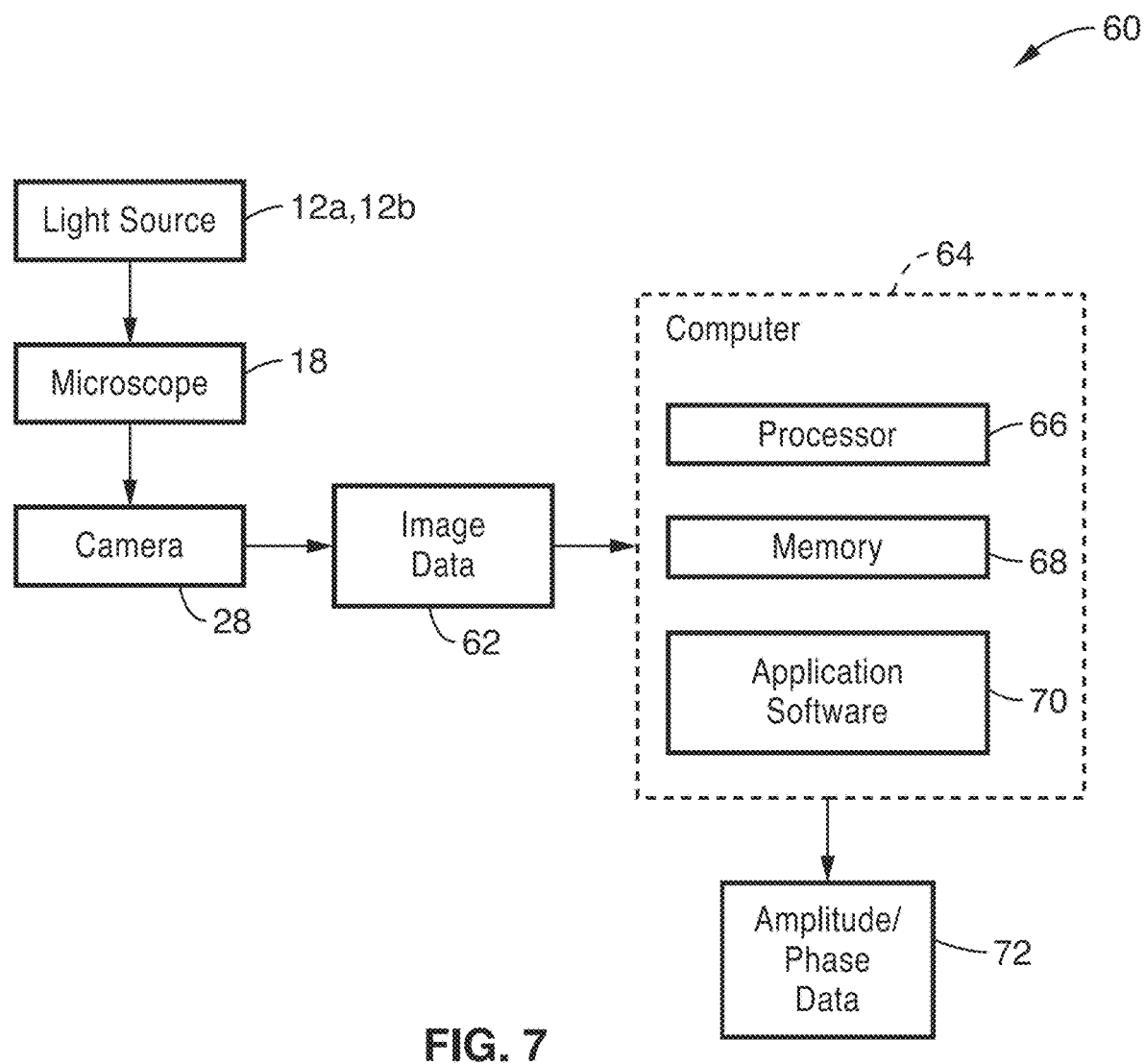
FIG. 7 shows a schematic view of hardware and software used in the cDPC optical phase retrieval system of the present description.

FIG. 7 shows a schematic view of an exemplary hardware and software set up of a cDPC optical phase retrieval system 60 in accordance with the present description. As with systems 10a and 10b, encoding the angular diversity of illumination into different spectral bands into microscope 18 can be accomplished via light source 12a using a spectral filter at the back focal plane of a condenser lens, or light source 12b using a multi-color LED array. Camera sensor 28 receives the modulated optical field passes through telescope and generates image data 62 that is received by computing device 64. Application software 70 (stored in memory 68) is configured to input the image data 62 (single image) and process the image via processor 66 via a deconvolution, as detailed below, to output amplitude and phase data 72 from the single image.

2. Computational Methods

Conventional DPC microscopy converts the amplitude (A) and optical phase (ϕ) information into the final intensity measurements. Eq. 1 and Eq. 2 show the mathematical expressions of optical phase and amplitude, respectively:

$$\phi = \frac{2\pi}{\lambda_0} nd \qquad \text{Eq. 1}$$

$$A = \frac{2\pi}{\lambda_0} \alpha d \qquad \text{Eq. 2}$$

where $\lambda_0$ is a reference wavelength of the optical field, d is the thickness of the sample, n represents refractive index and α indicates absorption coefficient. In conventional DPC microscopy using monochromatic (single color) illumination, the amplitude and phase transfer functions are fully determined by the system's illumination pattern, pupil function, and illumination wavelength. Monochromatic DPC assumes constant wavelength for acquisitions, and solves for the phase given the common illumination spectra.

However, in the color-multiplexed DPC (cDPC) system and method of the present description, the transfer functions must also consider the change in wavelength of each color channel. In addition, the choice of illumination wavelength is variable and arbitrary, so our definition of phase (ϕ) depends on which wavelength we use as our reference, since phase is defined in terms of wavelength $\lambda_0$. To resolve this ambiguity, we note that the optical path length (OPL=nd) and absorption length (AL=αd) are constant for all wavelengths (λ). Therefore, both amplitude and phase can be synthesizes for any wavelength by simply multiplying the AL and OPL by the wave number ($2\pi/\lambda_0$) for a desired reference wavelength, $\lambda_0$.

Using the weak-object approximation (WOA), the point spread functions (PSFs) or transfer functions for each color channel can be formulated based on a-priori information about our system. This enables us to develop a forward model for the formation of the measured intensity image, which is the sum of convolutions between color-dependent PSFs ($H_{A,m}$, $H_{\phi,n}$), defined at their respective wavelengths $\lambda_m$, and physical quantities (A, ϕ):

$$I = I_O + \Sigma_{m=1}^{N}(H_{A,m} \otimes A + H_{\phi,m} \otimes \phi) \quad \text{Eq. 3}$$

where I is the color intensity measurement, $I_O$ is the background signal, ⊗ indicates the convolution process, m is the wavelength index, N is the total number of wavelengths, $H_{A,m}$, $H_{\phi,m}$ are point spread functions for amplitude and phase respectively.

If we express this forward model in Fourier space by performing the 2D Fourier transform operation on both sides of the equation, we arrive at the following expression:

$$\tilde{I} = \tilde{I}_O + \Sigma_{m=1}^{N}(\tilde{H}_{A,m} \cdot \tilde{A} + \tilde{H}_{\phi,m} \cdot \tilde{\phi}) \quad \text{Eq. 4}$$

where $\tilde{\bullet}$ represents the Fourier transform representation of the function, (·) is the point-wise product, and $\tilde{H}_{\phi,m}$ and $\tilde{H}_{A,m}$ are the transfer functions for phase and amplitude, respectively, for a given wavelength index m.

Considering the influence of wavelength and our variable source $S(\lambda m)$ and pupil $P(\lambda m)$, the transfer functions are defined as:

$$\tilde{H}_{A,m} = \frac{\lambda_O}{\lambda_m}(P(\lambda_m) \cdot S(\lambda_m)) * P(\lambda_m) + P(\lambda_m) * (P(\lambda_m) \cdot S(\lambda_m)) \quad \text{Eq. 5}$$

$$\tilde{H}_{\phi,m} = i \cdot \frac{\lambda_O}{\lambda_m}(P(\lambda_m) \cdot S(\lambda_m)) * P(\lambda_m) + P(\lambda_m) * (P(\lambda_m) \cdot S(\lambda_m)) \quad \text{Eq. 6}$$

where $S(\lambda_m)$ and $P(\lambda_m)$ are wavelength dependent source shapes and pupil functions, and * represents the cross-correlation operation. Candidates for $S(\lambda m)$ in a practical implementation using asymmetric differential phase contrast are illustrated in FIG. 8A through FIG. 8E, showing the amplitude and phase transfer functions for wavelengths corresponding to blue light (λ=450 nm), green light (λ=550 nm), and red light (λ=650 nm), which in this configuration correspond to top, right, and bottom semi-circular illuminations, respectively. Here we note that the diameter of the transfer functions for each color channel are inversely proportional to the illumination wavelength. In practice, this means that using a blue light source of a given shape provides better resolution than a red light source which has the same shape. Our algorithm takes this discrepancy into account by incorporating wavelength directly into our forward model.

To retrieve the amplitude and phase of the object, we formulate our inverse problem as:

$$\min_{A,\phi} \Sigma_{m=1}^{N} |\tilde{I} - \tilde{I}_O - \tilde{H}_{\phi,m} \cdot \tilde{\phi} - \tilde{H}_{A,m} \cdot \tilde{A}|_2^2 + R(\phi, A) \quad \text{Eq. 7}$$

This problem is linear and can be solved with one-step deconvolution or iterative algorithm, such as steepest descent, and can be incorporated into application programming 70, as appropriate. The choice of regularizer R(Φ,A) depends on a-priori information about the object. For instance, if the sample is sparse (only a small number of pixels have non-zero values), one can use L1 regularization. On the other case, when the object has a limited amount of energy (value), L2 regularization can help avoiding amplification of the noise in the reconstruction. Similarly, other types of regularization such as sparsity of gradients can be applied based on different a-priori information. Application programming 70 may provide options for regularizer and other input variables as appropriate.

3. Results

A simulation of the cDPC phase retrieval technique was performed using 3 color channels and a devolution process with L2 regularization. For the partially coherent, asymmetric source patterns, color channels corresponding to wavelengths blue (450 nm), green (550 nm), and red (650 nm) light were used. These patterns were similar to those illustrated in FIG. 3.

The numerical aperture (NA) of the system was set to 0.25, image dimensions to 256×256, and pixel size to 0.325 μm, which corresponds to the same parameters of the commercial Nikon TE300 microscope with a 10× objective.

FIG. 9A though FIG. 10B show images of simulation results. FIG. 9A, FIG. 9B and FIG. 9C show the ground truth for amplitude (A) and phase (ϕ) and simulated intensity, respectively. FIG. 10A and FIG. 10B show the amplitude and phase recovered using the cDPC techniques of the present description. From these results, we can see that both A and ϕ are successfully reconstructed using the cDPC method of the present description. Note the high frequency features (edges) of ϕ which are mistakenly recovered in A. This is not artifact due to imperfection in the method, but rather results from the pupil clipping effect caused by limited NA, which are common to all imaging systems.

In addition to the simulation results, an experiment was performed to verify the capability of cDPC. We measured the phase and amplitude of a commercially available microlenslet array, where each lenslet has a side length of 130 μm, with an illumination pattern designed to replicate our simulation results in FIG. 9A through FIG. 10B. The image was taken using a Nikon AZ100 microscope with effective 4.8× magnification and a 0.1 NA objective.

FIG. 11A through FIG. 11C show images of intensity (left image FIG. 11A, after background subtraction), reconstructed amplitude (middle image FIG. 11B), and recovered phase (right image FIG. 11C).

FIG. 12 shows a plot of a 3D rendering of the surface profile of the micro-lens array within the region detailed by the white square in the phase reconstruction image of FIG. 11C using the cDPC deconvolution method. Because microlenses have little absorption, the amplitude is quite uniform across the field of view except for absorptive dust/particles or scratches on the lenslet surface. However, the recovered phase of the micron-lens array reveals high contrast due to large quadratic phase variation within each micro-lens. From both experimental and simulation results, we demonstrate the performance of our single-shot phase retrieval method using color multiplexing with partially coherent illumination.

4. Phase Imaging with Motion Deblur

Throughput is a primary concern for many imaging applications—for example, the clinical laboratory a large hospital may need to scan hundreds of histology slides per hour. Often, slide imaging or scanning large samples at high resolution requires the registration and tiling of many images acquired using a high-magnification objective. The acquisition of these datasets is often very long, owing to the precise positioning required as well as a necessary autofocusing step prior to each acquisition. Optimization of this process would clearly benefit hospitals and research centers studying datasets which necessitate a large field of view with high resolution.

Most modern high-throughput imaging systems use a stop-and-stare imaging style, where images are acquired by moving the sample to many positions, stopping, autofocusing, and finally acquiring an image. The full-field image is then stitched together using a registration algorithm. As mentioned previously, this method is often prohibitively slow due to the time necessary to stop and start the motion as well as autofocusing. A promising alternative to this scheme is strobed illumination, where the sample is moved constantly while the illumination is strobed, or flashed once each exposure using a very short, high-intensity pulse width. In this framework the image is still blurred, but the blurring is designed to be smaller than the system PSF causing no image degradation.

Strobed illumination is an ideal implementation in many applications. However, producing a very bright, very short pulse can often be difficult, particularly when a sample is moving fast, or in a low-resource setting such as a portable device where illumination power and intensity are restricted. A promising alternative to strobed illumination is motion compensation using a deblurring algorithm which incorporates hardware coding techniques.

Phase imaging using the Weak Object Transfer Function (WOTF) is highly compatible with motion deblur since both are modeled as linear convolutions on the same object. Our forward model for single image phase imaging with motion deblur is a combination of the existing motion deblur model with the WOA. In the case of a single image, we model the blurred intensity image as two separate convolutions, applied sequentially:

$$\tilde{I}=B*[H_\mu*A+H_\phi*\phi] \qquad \text{Eq. 8}$$

We can express the above equation as a block-wise matrix product in the Fourier domain, letting $\tilde{B}$, $\tilde{H}_\mu$ and $\tilde{H}_\phi$ be the diagonalized Fourier Transforms of the transform functions, and $\tilde{I}$, $\tilde{\mu}$ and $\tilde{\phi}$ be the vectorized image and object components respectively:

$$\tilde{I}=\tilde{B}\cdot[\tilde{H}_\mu \tilde{H}_\phi][\tilde{\phi}\tilde{\mu}] \qquad \text{Eq. 9}$$

Combining measurements from the three color channels, we model the full over-determined system as:

$$\begin{bmatrix}\tilde{I}_R\\\tilde{I}_G\\\tilde{I}_B\end{bmatrix}=\begin{bmatrix}\tilde{B}_R & 0 & 0\\0 & \tilde{B}_G & 0\\0 & 0 & \tilde{B}_B\end{bmatrix}\times\begin{bmatrix}\tilde{H}_{\mu,R} & \tilde{H}_{\phi,R}\\\tilde{H}_{\mu,G} & \tilde{H}_{\phi,G}\\\tilde{H}_{\mu,B} & \tilde{H}_{\phi,B}\end{bmatrix}\times\begin{bmatrix}\tilde{\mu}\\\tilde{\phi}\end{bmatrix} \qquad \text{Eq. 10}$$

Our patterns are configured such that the condition number of the blur kernel is minimized. By combining both motion deblurring and the linearized phase retrieval technique presented in the previous section, we can use knowledge of our WOTF as derived previously to influence our choice of B to improve our overall phase and amplitude reconstruction from blurred data. The motion deblur problem as presented here will always degrade the result even with an ideal B due to the constraints placed on the optimization problem. In the previous case, degradation due to the blurring operation was minimized by solving for a blur kernel with an optimally flat Fourier spectrum. This method, however, did not take into account the additional attenuation due to the OTF of the optical system.

A unique aspect of the deblur methods of the present description is to consider the spectrums of cascaded filters in our system when designing our blur kernel. We can think of our sequential deconvolution problem as a single-step deconvolution which inverts the element-wise product of the blur kernel and WOTF's in the Fourier Domain. Therefore, the relative attenuation produced by the blur kernel at each frequency can be matched to reduce the degradation to highly attenuated frequencies in the WOTF, such as high frequencies in both amplitude and phase WOTF's, as well as low frequencies in the phase WOTF. The exact structure of this transfer function depends on the pupil function of the optical system and design of the source. In practice, we note that the phase transfer function is of higher order than the amplitude transfer function (OTF), which generally means there are more zero crossings and values close to zero in the phase transfer function. Therefore, we will use the phase transfer function for optimizing the blur kernel.

To solve for the optimal blur kernel considering the WOTF, we model Eq. 11 to consider a 1D spectral reference q, which provides a measure of the attenuation imposed by the optical system at each spatial frequency in the blur kernel:

$$\underset{B}{\text{minimize}} \frac{\max|\tilde{B}\cdot\tilde{q}|}{\min|\tilde{B}\cdot\tilde{q}|} \qquad \text{Eq. 11}$$

$$\text{subject to } \sum_{N=1}^{N} B[n]\geq\gamma N, 0\leq B[n]\leq 1 \forall n$$

For linear kernels, we chose q to be the sum of the magnitude of the phase transfer function along the direction orthogonal to the blur direction as shown in FIG. 14. This quantity can be though of as a penalty function for attenuating each spatial frequency during the blurring process—if the OTF is already very low at a given frequency, the blur kernel should try not to attenuate this frequency significantly. Since the blurring filter is applied in hardware, this process improves noise performance for frequencies which are heavily attenuated by the optical system. It is important to note that this method will never improve resolution or noise performance beyond the static solution—however, it can greatly reduce the degradation due to the blurring process, making deblurring practical for high-speed quantitative imaging applications.

FIG. 13 shows a visual forward model description of motion deblurring in the object (native) domain as well as the Fourier (frequency) domain. In this forward model, we consider the optical transfer function of the imaging system in the analysis of the frequency support of the object. The top row shows the object domain forward model, and the bottom row shows the Fourier domain forward model, which is related to the object forward model by a two-dimensional Fourier Transform operator.

FIG. 14 shows motion blurring kernels for 1D motion in the Fourier Domain. The left column shown unblurred absorption 80 and phase 90 transfer functions. The second column shows the Fourier transform of constant (non-coded) blur kernel. The top 82 and bottom 92 spectra in this column are the product of the unblurred transfer function and this center spectrum. In the third column, blurred transfer function spectra 84, and 94 are shown for temporal coding which does not consider WOTF structure. In the fourth column, blurred transfer function spectra 86 and 96 are shown for temporal coding which emphasizes low and high frequencies based on WOTF structure.

Simulation results for motion deblurring+quantitative phase imaging are shown in FIG. 15A through FIG. 15D and FIG. 16A through FIG. 16D. In FIG. 15A and FIG. 16A we show recovered phase and recovered amplitude, respectively, for a static sample. In FIG. 15B and FIG. 16B we show recovered phase and recovered amplitude, respectively, for deblurring without coded illumination. In FIG. 15C and FIG. 16C we show recovered phase and recovered amplitude, respectively, for deblurring with the previous method (no spectral reference). In FIG. 15D and FIG. 16D we show recovered phase and recovered amplitude, respectively, for deblurring using the method of the present description, which accounts for the optical system transfer function.

In this simulation we note that the normalized sum-squared error (N-SSE) in phase is reduced significantly in our method. The amplitude N-SSE did increase slightly using our method, which is likely due to the fact that we used the phase WOTF for generating our blur kernels instead of amplitude. The choice of which WOTF to use could be application-dependent.

To verify our results in experiment, we developed a system which consists of a commercial Nikon AZ100 microscope using a 1×0.10 NA objective, a Bayer-patterned SCMOS camera (PCO edge 5.5), an XY stage with linear encoders, (Prior H117), and illumination from 23 multi-channel LEDs (Jameco 2128500) arranged in a hexagonal pattern using a laser-cut holder for positioning. The LEDs were placed approximately 160 mm from the sample to match the spacing such that the outer LEDs illuminate the sample from angles just inside of the NA of the microscope. This is done to ensure maximum phase contrast and bandwidth (resolution) of the system. The LEDs are controlled using a Teensy 3.2 microcontroller, which can be dynamically programmed. Camera exposures, stage movement, and illumination modulation are controlled using open-looped feedback with 5 ms synchronization resolution, limited by the update speed of the LED array.

Our forward model considers the case where our LED illumination is incoherent and discrete, both spatially and temporally. We assume each emitter has three coincident emitters for Red ($\bar{\lambda}=625$), Green ($\bar{\lambda}=525$), and Blue ($\bar{\lambda}=470$), wavelengths, which propagate through the optical system independently of each other and are detected separately by the Bayer filter of the color camera. We assume a sample which is non-dispersive and unstained. A velocity of 25 mm per second was used for sample movement, but this could be increased by improving hardware synchronization. Blur kernels were calculated using the calibrated phase WOTFs for each color channel separately, considering the spacing of k-space due to wavelength.

To test our method, we used a micro-lens array (Fresnel-Tech 605) as our sample due to its well-defined geometry. Reconstructions for the static case, previous method, and our method were performed. While the sample amplitude was relatively unchanged, the phase reconstructions clearly show that accounting for the spectral reference provides better results than optimizing the blur kernel alone. This supports our claim that image degradation from blurring can be reduced significantly, but not eliminated, using our method.

5. Advantages

The cDPC deconvolution method of the present description needs only a single image to recover both amplitude and phase. Unlike the original Differential Phase Contrast inversion method, the cDPC deconvolution method uses a RGB color camera (e.g. Bayer patterned or similar patterning) to acquire the same information in a single image. This is done by multiplexing different images corresponding to different asymmetric illumination patterns into the color channels, which propagate independently of each other through the optical system. Single-shot imaging is substantially more useful than multiple exposures, enabling camera limited video frame rates and the use of standard file formats. The raw frames are useful qualitatively due to embedded phase contrast, but can also be post-processed using a simple linear algorithm to recover the quantitative amplitude and phase.

The cDPC deconvolution method has minimal hardware requirements, which are comparable to existing phase imaging methods, but provides substantially more information. The proposed condenser insert 40 embodiment of FIG. 4 is installed and used in the same way as both phase contrast and Differential Interference Contrast (DIC) microscopes that are widely in use, but is advantageous because it enables the quantitative recovery of phase rather than purely diagnostic images. These quantitative images can also be used to synthesize both phase contrast and DIC images digitally, since we can recover phase directly through computation rather than displaying phase in an ad-hoc way. In addition, the cDPC deconvolution method does not require complicated hardware or the mechanical stability common in interferometric setups, and can use either a programmable LED array or simple condenser insert to modulate the illumination. The cDPC deconvolution method does not require phase unwrapping, but recovers phase information directly.

The cDPC deconvolution method can be implemented cheaply using several hardware configurations, such as a programmable LED array or color filter insert, and is compatible with most infinity corrected microscopes which provide access to the back focal plane. Infinity-corrected systems have become commonplace in recent years, which makes the cDPC deconvolution method especially viable. The cDPC deconvolution method can recover phase using a simple condenser insert having several band-pass filters spanning the back focal plane in an asymmetric arrangement. This configuration is compatible with any modern current phase contrast or DIC microscope with removable condenser inserts. Furthermore, similar results can be achieved using a programmable multi-color LED array, making it compatible with complimentary super-resolution methods.

The cDPC deconvolution method uses partially coherent illumination, which provides twice the resolution compared to coherent phase retrieval techniques. Coherent imaging methods such as interferometry or Transport of Intensity (TIE) phase imaging require coherent illumination, which limits the spatial resolution of the images. The cDPC deconvolution method uses a partially coherent illumination pattern, which provides similar resolution to bright-field imaging (2×Improvement in resolution over coherent imaging). Moreover, the cDPC deconvolution method does not suffer from loss of field of view as is the case for single-shot off-axis holography.

Since the cDPC deconvolution method is single-shot, it may be used in conjunction with a wide-variety of computational imaging techniques, such as recovering an image of a moving sample using a motion deconvolution algorithm or acquiring a high-speed quantitative phase video of a transparent sample.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that that the present disclosure encompasses multiple embodiments which include, but are not limited to, the following:

1. An apparatus for recovering phase and amplitude data from an image of a sample, comprising: (a) an encoded light source configured for providing a partially coherent illumination that embeds multiple illumination patterns into a plurality of color channels each at distinct illumination wavelengths; (b) one or more optical elements configured for directing said partially coherent illumination on the sample, wherein the sample is modulated by each illumination wavelength separately and independently of each other; (c) an optical imaging device configured for sensing all color channels simultaneously; (d) a processing unit; and (e) a non-transitory memory storing instructions executable by the processing unit; (d) wherein said instructions, when executed by the processing unit, perform steps comprising: (i) generating a color image of the sample containing information about both phase and amplitude of the sample.

2. The apparatus of any preceding embodiment, wherein said instructions, when executed by the processing unit, further perform steps comprising: extracting quantitative amplitude and phase data from the color image of the sample.

3. The apparatus of any preceding embodiment, wherein the amplitude and phase data are extracted via processing the image via a single deconvolution.

4. The apparatus of any preceding embodiment, wherein the deconvolution is performed via L2 regularization.

5. The apparatus of any preceding embodiment, wherein the deconvolution is performed via L1 regularization on the object or object gradient.

6. The apparatus of any preceding embodiment, wherein the deconvolution is performed via the equation: $\min_{A,\phi} \Sigma_{m=1}^{N} |\tilde{I} - \tilde{I}_O - \tilde{H}_{\phi,m} \cdot \tilde{\phi} - \tilde{H}_{A,m} \cdot \tilde{A}|_2^2 + R(\phi, A)$; wherein I is a color intensity measurement, I0 is a background signal, N is the total number of wavelengths, A is amplitude, $\phi$ is phase, $\tilde{H}\phi$,m and $\tilde{H}A$,m are transfer functions for phase and amplitude, respectively, for a given wavelength index m, and $R(\phi, A)$ is a regularizer function.

7. The apparatus of any preceding embodiment, wherein regularizer $R(\phi,A)$ is selected based on depends on a-priori information about the sample.

8. The apparatus of any preceding embodiment, wherein said encoded light source comprises a broadband light source coupled to a static multiple-color filter configured to separate the broadband light into the multiple illumination patterns and encode the illumination into different spectral bands.

9. The apparatus of any preceding embodiment, wherein said encoded light source comprises a multiple-color LED configured generate the multiple illumination patterns and encode the illumination into different spectral bands.

10. The apparatus of any preceding embodiment: wherein the one or more optical elements comprises a microscope; and wherein the multiple-color filter is configured to be positioned adjacent a back focal plane of a microscope.

11. The apparatus of any preceding embodiment, wherein the multiple-color filter comprises a filter insert configured to be positioned at the back focal plane of the condenser of the microscope.

12. The apparatus of any preceding embodiment, wherein said encoded light source is configured to provide contrast in either phase or amplitude.

13. The apparatus of any preceding embodiment, wherein the amplitude and phase data are extracted from a single image by said optical imaging device.

14. The apparatus of any preceding embodiment, wherein said instructions, when executed by the processing unit, further perform steps comprising: single image phase and amplitude imaging of the sample with motion deblurring.

15. A method for recovering phase and amplitude data from an image of a sample, comprising: encoding a source of light into a partially coherent illumination that embeds multiple illumination patterns into a plurality of color channels each at distinct illumination wavelengths; directing said partially coherent illumination on the sample and modulating the sample by each illumination wavelength separately and independently of each other; for sensing all color channels simultaneously; and generating a color image of the sample containing information about both phase and amplitude of the sample.

16. The method of any preceding embodiment, further comprising: extracting quantitative amplitude and phase data from the color image of the sample.

17. The method of any preceding embodiment, wherein the amplitude and phase data are extracted via processing the image via a single deconvolution.

18. The method of any preceding embodiment, wherein the deconvolution is performed via L2 regularization.

19. The method of any preceding embodiment, wherein the deconvolution is performed via L1 regularization on the object or object gradient.

20. The method of any preceding embodiment, wherein the deconvolution is performed via the equation: $\min_{A,\phi} \Sigma_{m=1}^{N} |\tilde{I} - \tilde{I}_O - \tilde{H}_{\phi,m} \cdot \tilde{\phi} - \tilde{H}_{A,m} \cdot \tilde{A}|_2^2 + R(\phi,A)$; wherein I is a color intensity measurement, I0 is a background signal, N is the total number of wavelengths, A is amplitude, $\phi$ is phase, $\tilde{H}\phi$, m and $\tilde{H}_{A,m}$ are transfer functions for phase and amplitude, respectively, for a given wavelength index m, and $R(\phi,A)$ is a regularizer function.

21. The method of any preceding embodiment, wherein regularizer $R(\phi,A)$ is selected based on depends on a-priori information about the sample.

22. The method of any preceding embodiment, wherein the amplitude and phase data are extracted from a single image by said optical imaging device.

23. The method of any preceding embodiment, further comprising: single image phase imaging of the sample with motion deblurring of the sample.

24. The method of any preceding embodiment, wherein motion deblurring comprises: applying motion to the sample during imaging of the sample; and applying a motion deblurring algorithm.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for recovering phase and amplitude data from an image of a sample, comprising:
   (a) an encoded light source configured for providing a partially coherent illumination that embeds multiple illumination patterns into a plurality of color channels each at distinct illumination wavelengths;
   (b) one or more optical elements configured for directing said partially coherent illumination on the sample, wherein the sample is modulated by each illumination wavelength separately and independently of each other;
   (c) an optical imaging device configured for sensing all color channels simultaneously;
   (d) a processing unit; and
   (e) a non-transitory memory storing instructions executable by the processing unit;
   (f) wherein said instructions, when executed by the processing unit, perform steps comprising:
   (g) generating a color image of the sample containing information about both phase and amplitude of the sample; and
   (h) extracting quantitative amplitude and phase data from the color image of the sample by processing the image with a single deconvolution:

$$\min_{A,\phi} \Sigma_{m=1}^{N} |\tilde{I} - \tilde{I}_O - \tilde{H}_{\phi,m} \cdot \tilde{\phi} - \tilde{H}_{A,m} \cdot \tilde{A}|_2^2 + R(\phi,A):$$

wherein $\tilde{I}$ is a color intensity measurement, $\tilde{I}_O$ is a background signal, N is the total number of wavelengths, $\tilde{A}$ is amplitude, $\tilde{\phi}$ is phase, $\tilde{H}_{\phi,m}$ and $\tilde{H}_{A,m}$ are transfer functions for phase and amplitude, respectively, for a given wavelength index m, and $R(\phi, A)$ is a regularizer function.

2. The apparatus of claim 1, wherein regularizer $R(\phi,A)$ is selected based on a priori information about the sample.

3. The apparatus of claim 1, wherein said encoded light source comprises a broadband light source coupled to a static multiple-color filter configured to separate the broadband light into the multiple illumination patterns and encode the illumination into different spectral bands.

4. The apparatus of claim 1, wherein said encoded light source comprises a multiple-color LED configured generate the multiple illumination patterns and encode the illumination into different spectral bands.

5. The apparatus of claim 3:
   wherein the one or more optical elements comprises a microscope; and
   wherein the multiple-color filter is configured to be positioned adjacent a back focal plane of a microscope.

6. The apparatus of claim 5, wherein the multiple-color filter comprises a filter insert configured to be positioned at the back focal plane of a condenser lens of the microscope.

7. The apparatus of claim 1, wherein said encoded light source is configured to provide contrast in either phase or amplitude.

8. The apparatus of claim 1, wherein the amplitude and phase data are extracted from a single image by said optical imaging device.

9. The apparatus of claim 1, wherein said instructions, when executed by the processing unit, further perform steps comprising:
   single image phase and amplitude imaging of the sample with motion deblurring.

10. A method for recovering phase and amplitude data from an image of a sample, comprising:
- encoding a source of light into a partially coherent illumination that embeds multiple illumination patterns into a plurality of color channels each at distinct illumination wavelengths;
- directing said partially coherent illumination on the sample and modulating the sample by each illumination wavelength separately and independently of each other;
- for sensing all color channels simultaneously;
- generating a color image of the sample containing information about both phase and amplitude of the sample; and
- extracting quantitative amplitude and phase data from the color image of the sample by processing the image with a single deconvolution:

wherein $\tilde{I}$ is a color intensity measurement, $\tilde{I}_O$ is a background signal, N is the total number of wavelengths, $\tilde{A}$ is amplitude, $\tilde{\phi}$ is phase, $\tilde{H}_{\phi,m}$ and $\tilde{H}_{A,m}$ are transfer functions for phase and amplitude, respectively, for a given wavelength index m, and $R(\phi, A)$ is a regularizer function.

11. The method of claim 10, wherein regularizer $R(\phi,A)$ is selected based on a priori information about the sample.

12. The method of claim 10, wherein the amplitude and phase data are extracted from a single image by said optical imaging device.

13. The method of claim 10, further comprising:
- single image phase imaging of the sample with motion deblurring of the sample.

14. The method of claim 13, wherein motion deblurring comprises:
- applying motion to the sample during imaging of the sample; and
- applying a motion deblurring algorithm.

15. An apparatus for recovering phase and amplitude data from an image of a sample, comprising:
- (a) an encoded light source configured for providing a partially coherent illumination that embeds multiple illumination patterns into a plurality of color channels each at distinct illumination wavelengths;
- (b) one or more optical elements configured for directing said partially coherent illumination on the sample, wherein the sample is modulated by each illumination wavelength separately and independently of each other;
- (c) an optical imaging device configured for sensing all color channels simultaneously;
- (d) a processing unit; and
- (e) a non-transitory memory storing instructions executable by the processing unit;
- (f) wherein said instructions, when executed by the processing unit, perform steps comprising:
- (g) generating a color image of the sample containing information about both phase and amplitude of the sample; and
- (h) extracting quantitative amplitude and phase data from the color image of the sample by processing the image with a single deconvolution selected from the group consisting of (i) an $L_2$ regularization and (ii) an $L_1$ regularization on an object or object gradient.

16. The apparatus of claim 15, wherein said encoded light source comprises a broadband light source coupled to a static multiple-color filter configured to separate the broadband light into the multiple illumination patterns and encode the illumination into different spectral bands.

17. The apparatus of claim 15, wherein said encoded light source comprises a multiple-color LED configured generate the multiple illumination patterns and encode the illumination into different spectral bands.

18. The apparatus of claim 17:
- wherein the one or more optical elements comprises a microscope; and
- wherein the multiple-color filter is configured to be positioned adjacent a back focal plane of a microscope.

19. The apparatus of claim 18, wherein the multiple-color filter comprises a filter insert configured to be positioned at the back focal plane of a condenser lens of the microscope.

20. The apparatus of claim 15, wherein said encoded light source is configured to provide contrast in either phase or amplitude.

21. The apparatus of claim 15, wherein the amplitude and phase data are extracted from a single image by said optical imaging device.

22. The apparatus of claim 15, wherein said instructions, when executed by the processing unit, further perform steps comprising:
- single image phase and amplitude imaging of the sample with motion deblurring.

23. A method for recovering phase and amplitude data from an image of a sample, comprising:
- encoding a source of light into a partially coherent illumination that embeds multiple illumination patterns into a plurality of color channels each at distinct illumination wavelengths;
- directing said partially coherent illumination on the sample and modulating the sample by each illumination wavelength separately and independently of each other;
- for sensing all color channels simultaneously;
- generating a color image of the sample containing information about both phase and amplitude of the sample; and
- extracting quantitative amplitude and phase data from the color image of the sample by processing the image with a single deconvolution selected from the group consisting of (i) an $L_2$ regularization and (ii) an $L_1$ regularization on an object or object gradient.

24. The method of claim 23, wherein the amplitude and phase data are extracted from a single image by said optical imaging device.

25. The method of claim 23, further comprising:
- single image phase imaging of the sample with motion deblurring of the sample.

26. The method of claim 25, wherein motion deblurring comprises:
- applying motion to the sample during imaging of the sample; and
- applying a motion deblurring algorithm.

* * * * *